Figure 1:
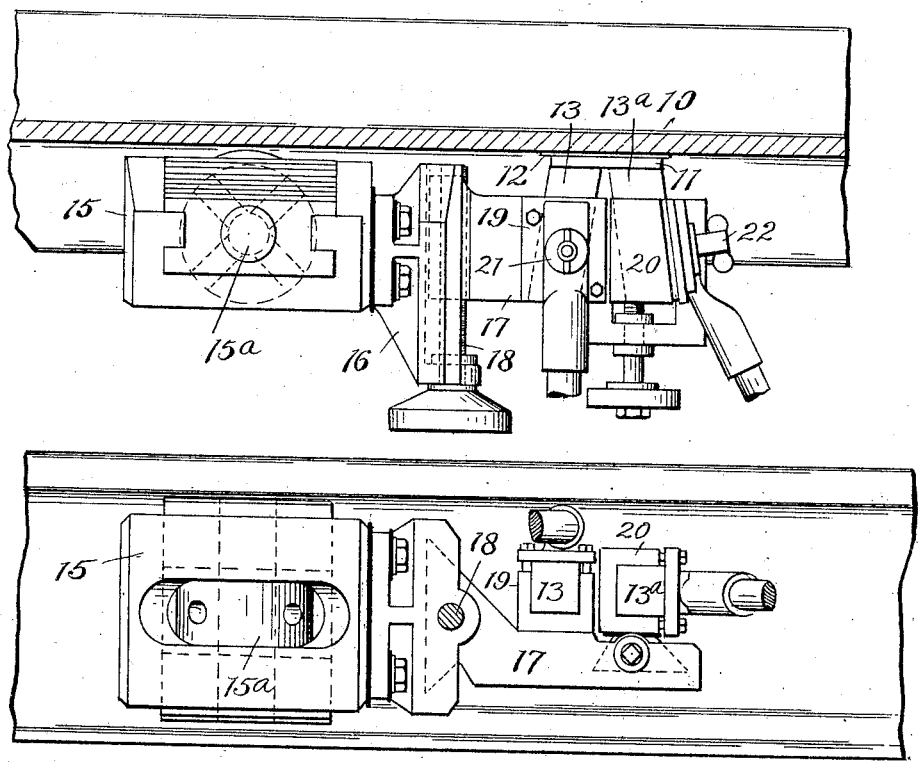

L. P. CRECELIUS.
PROCESS OF UNITING METAL BODIES.
APPLICATION FILED JUNE 18, 1913. RENEWED SEPT. 3, 1914.

1,133,268.

Patented Mar. 30, 1915.

Witnesses
E. B. Gilchrist
L. I. Porter

Inventor
Lawrence P. Crecelius
by Thurston & Kwis
Attys.

UNITED STATES PATENT OFFICE.

LAWRENCE P. CRECELIUS, OF CLEVELAND, OHIO.

PROCESS OF UNITING METAL BODIES.

1,133,268.      Specification of Letters Patent.     Patented Mar. 30, 1915.

Application filed June 18, 1913, Serial No. 774,313. Renewed September 3, 1914. Serial No. 860,100.

*To all whom it may concern:*

Be it known that I, LAWRENCE P. CRECELIUS, a citizen of the United States, residing at Cleveland, in the county of Cuyahoga and State of Ohio, have invented a certain new and useful Improvement in Processes of Uniting Metal Bodies, of which the following is a full, clear, and exact description.

This invention relates to improvements in processes of uniting or joining metal bodies, and is adapted especially for soldering or brazing copper bonds to rails, or for uniting by soldering or brazing other metal bodies having different masses or different thermal characteristics, such as fusion points or heat conductivities.

It is very common, and has been for many years, to weld, braze or solder together metal bodies, by what is known as the Thomson process, which consists chiefly in heating the contacting or adjacent faces or portions of the bodies to be united, by means of an electric current which is caused to pass across the joint directly through the bodies, and through the interposed solder or braze, in case the joint is soldered or brazed, so as to heat the adjacent parts to welding, soldering or brazing temperatures. As far as I am aware, prior to my invention, the Thomson process has been used in practically all welding, brazing, or soldering operations, wherein electricity is used as the heating agent, although the process may and frequently is modified to a slight extent in one way or another. A modification of the Thomson process which has been practised to some extent consists in utilizing in addition to the current for heating purposes, one or more high resistance electrodes, which are heated and transmit heat by conduction to the parts to be united. In all instances, however, where these modifications are carried out in a practical way, the current passes directly across the joint, or through the bodies to be united, and the passage of the current across the jointure or joints formed by the contacting members, is a factor in heating the parts to welding, brazing or soldering temperatures.

At the present time, it is common to unite or fasten the terminal of a rail bond, to a steel rail by that modification of the Thomson process referred to above, which consists in passing the current through the bond, rail, and an interposed soldering or brazing material, of lower fusion point than the copper, and through a single high resistance electrode, which is pressed against the bond terminal. In some manner, there has arisen an erroneous impression, first, that the bond and a rail are welded by this process, and second, that the heating is due solely to the single high resistance electrode which is held or pressed against the bond. While it is true that bonds can be successfully united to rails in this manner, careful experiments and tests have demonstrated the fact that the bond and rail are brazed or soldered, and not welded, and that the current itself, as well as the heating electrode, is a direct heating agency. That the bond and rail could not be welded together by applying heat only to the bond by means of the high resistance electrode, is obvious, when there is taken into consideration the great disparity in the fusion points of copper and steel, and the capacity of the rail for conducting and absorbing heat. Inasmuch as the fusion point of steel is about 2600° F., and the fusion point of copper is about 1950° F., before the rail could be brought to a welding temperature, the terminal of the bond would not only be melted, but would be absolutely destroyed. In fact, it has been demonstrated that when a single high resistance electrode is pressed against the copper bond to heat the same, and although the heating action of the electrode is augmented by the direct heating action of the current in passing across the joint, when no brazing material is interposed between the bond and the rail, the bond is fused and in fact destroyed before the portion of the rail adjacent the bond can be raised to a welding temperature. In consequence, the bond and rail can not be successfully welded in this manner, and in fact, cannot be united at all satisfactorily without the use of an interposed brazing material, and when the latter is used; they can be successfully united, but in such case, they are brazed together, and not welded. Apparatus which carries out the above mentioned process for brazing together the bond and rails is used today with considerable success, but as before stated, the single high resistance heating electrode, even when assisted by the passage of current across the joint, will not produce a satisfactory weld without destroying the bond terminal, although it has been alleged by some and erroneously believed by many, both that a weld was produced, and that the high resistance electrode alone was the heating agent. It has even been proposed or suggested that a copper bond and a steel rail could be welded together by applying heat directly only to the bond by passing current simply through a high resistance electrode held against the bond, and not through the parts to be united. While this suggestion might be carried out, with some degree of success for brazing or soldering the bond and rail, it could not be employed to weld the same. But as far as I am aware, no apparatus has ever been developed which could successfully carry out the idea or suggestion, even for brazing purposes.

The object of the present invention is to provide a method of uniting metal bodies which is especially applicable to the brazing of parts having widely different masses or thermal characteristics, and which requires far less current and is more economical than the most approved methods in use at the present time.

A further object is to provide a method of quickly and effectively brazing or soldering together copper bonds and steel rails.

In carrying out my invention, I apply heat directly to one of two or more juxtaposed bodies by the use of a plurality of high resistance electrodes, which are pressed against the body to be directly heated thereby.

In the preferred embodiment of my invention, I use two electrodes, which are connected to the terminals of a source of current so that the current passes through the electrodes and through the body in engagement therewith in series relationship, the current passing through one high resistance electrode into the body to be heated, and thence from said body to and through the second electrode, with the result that said body is heated by the two electrodes, (the heat passing therefrom to the body by conduction), by the heat generated at the surfaces of contact between the electrodes and the body, and by the direct action of the current in passing lengthwise through the body from one high resistance electrode to the other. The heat thus imparted to one body is transmitted to the other body by conduction, and when the process is used for uniting two bodies of widely different masses, or different thermal characteristics, such as a bond and rail, the process is used for brazing, in which case, a spelter is inserted between the bond and rail, and the spelter and rail are heated by conduction until the spelter is fused, the fusion point of spelter being below the fusion or welding temperatures of copper and steel.

Figure 2:
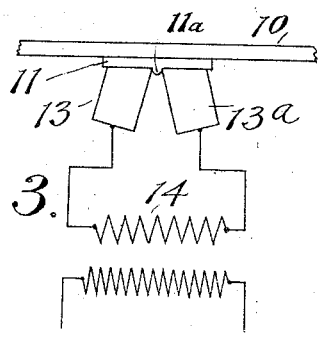
Figure 3:

Referring now to the drawings, wherein I have shown an apparatus which can be used for carrying out my improved process in a satisfactory manner for rail bonding purposes, Figure 1 is a top plan view of the apparatus with the rail in section, the section being taken through the web of the rail to which a terminal of the bond is adapted to be brazed. Fig. 2 is a side view of the same, and Fig. 3 is a diagrammatic view showing the electrical connections, and showing the parts after the bond terminal is brazed to the rail.

In the drawings, 10 represents the rail, 11 the terminal of the bond which is to be brazed to the rail, and 12 the interposed soldering or brazing material which may be called a spelter. The particular material used for the spelter will depend upon circumstances or the use to which the brazed parts are to be employed, but in any event, it is necessary that the spelter have a lower fusion point than the body against which the high resistance electrodes are pressed. In the case of rail bonding, I prefer to use as a spelter, brass which has a lower fusion point than copper, and is very effective from mechanical and electrical standpoints for rail bonding purposes.

To heat the bond terminal 11, while clamped against the rail or against the spelter, which is interposed between the rail and bond terminal, and hence to indirectly heat the spelter and that portion of the rail which is opposite or contiguous to the bond terminal, so that the bond terminal and the adjoining surface of the rail will be raised to brazing temperatures and the spelter will be fused, I employ two high resistance electrodes 13 and 13$^a$, the inner ends of which are adjacent each other, and both of which are adapted to be pressed against the face of the bond terminal, as shown in the drawings. These electrodes which are carried by an adjustable support and are insulated from each other, are electrically connected to the secondary 14 of a suitable transformer, so that the current passes from one terminal of the secondary, through one high resistance electrode into the bond, and from the bond through the other high resistance electrode, and thence to the other terminal of the secondary,—the electrodes and the bond terminal being in series relationship, or the current passing through the three members, all in series relationship. Both of the electrodes are heated to a high degree by the current passing through them, and both serve to heat the bond terminal by conduction. Also the bond terminal is heated directly by the current passing through it, and by the action of the current passing across or between the engaging or contacting surfaces of the bond and electrodes. With this arrangement, I obtain the same or even greater heating effect than with the use of a single heating electrode, but with substantially one half the amount of current. This permits me to reduce very materially the size of the conductors extending between the electrodes and the terminals of the source of current, and for this and other reasons, the apparatus can be handled much more easily than heretofore, and can be conveyed from point to point without requiring a car which runs along the rails of a track, and interferes with traffic.

It will be understood that heat passes by conduction to the spelter 12, and to the rail. The bond terminal is heated to a sufficiently high temperature to fuse the spelter and to bring both the bond terminal and the adjoining surface of the rail to brazing temperatures. Neither the bond terminal, nor the rail need be raised to welding temperature, and although the bond terminal may be raised to welding temperature, the rail cannot be raised to welding temperature, nor is it by this process required to be raised to a welding temperature. An additional very important advantage of this method is attained by reason of the fact that the electrodes are at their inner ends spaced a short distance apart. Just at or substantially at the instant when the braze is actually made between the bond terminal and the rail, the terminal reaches a temperature such that it becomes soft or is softened to a sufficient extent that the pressure of the electrodes on the terminal flattens or reduces in thickness the portions of the bond terminals in contact therewith, especially as the electrodes are moved forwardly so as to maintain substantially constant pressure on the bond terminal as the braze fuses. This leaves between the electrodes a ridge or rib 11ª, as shown in Fig. 3, which is midway between the ends of the terminal, and leads to or is in line with the connector joining the two terminals of the bond, (as the bond is preferably constructed), and forms a good current conducting path between the terminal and connector, after the bond is brazed to the rail. It will be understood, however, that although the inner ends of the high resistance electrodes are preferably spaced a sufficient distance apart to leave the outstanding rib or ridge just referred to, the bond terminal is, however, brazed to the rail uniformly from one end of the terminal to the other.

In Figs. 1 and 2, I have shown one form of electrode carrier and clamp which answers the requirements with high efficiency. This electrode carrier includes a supporting body 15, carrying a pair of jaws which are adapted to be moved toward or away from each other, in a vertical direction, and may be caused to engage between the head and flange of the rail by an adjustable capstan screw 15ª, so as to clamp the body firmly to the rail below the gage line of the latter, and in such a way as to leave the gage line clear and unobstructed.

The body 15 has secured to it, and preferably insulated therefrom, a slide holder 16 from which projects a slide or arm 17 which extends laterally alongside the web of the rail, and has a dove-tailed sliding connection with the member 16, which is provided with an adjusting screw 18 by which said arm can be adjusted toward and away from the rail, and by the adjustment of which,—the electrodes can be caused to bear against the bond with great pressure. This arm has secured to it two electrode holders 19 and 20, in which are firmly secured the two high resistance electrodes previously referred to. One of these electrode holders is insulated from the arm, and is carried by an adjustable slide so that the two electrodes are relatively adjustable. Both electrodes are provided with terminal end clamps 21 and 22, by which terminals leading from the ends of the secondary are adapted to be securely connected electrically to the electrode holders. In the use of this apparatus, the electrode holders will be adjusted relatively until both bear equally against the terminal. Thence the arm is adjusted toward the rail so as to cause the electrodes to firmly clamp the bond terminal against the rail. Thence the heating current is passed through the two electrodes and bond terminal in series, and the heat thus created in and imparted to the bond and conducted to the spelter and rail, causes the parts to be brazed, so as to provide a joint of the desired efficiency, both from electrical and mechanical standpoints.

The relative adjustability of the electrodes, that is, the adjustability of the electrodes toward and away from the bond or other body being heated is an essential characteristic of the process, for while the parts are being heated in the manner above described, the operator must adjust one or both of the electrodes to maintain the right resistances at the points or surfaces of contact between the electrodes and the body which they engage. This adjustability is rendered necessary because it is impossible to obtain absolutely the same conditions as to resistance or conductivity in the two electrodes, and at the joints or surfaces of contact between the electrodes and the body which they engage, and this more or less unbalanced condition which always prevails will cause a greater heating effect opposite that electrode whose contact resistance is the greater, and unless the operator reduces the resistance by a relative adjustment of the electrodes, the resistance and heating effect will build up so rapidly that an arc will be created at said electrode, quickly fusing the metal, and causing an opening of the circuit and instant termination of the process. This is, however, avoided by the operator who will adjust one or both of the electrodes, so as to maintain what may be termed a thermic balance, so that the heating effects opposite both electrodes will be uniform. To obtain the desired results it may not be necessary to have the contact resistance of both electrodes the same, as, for instance, when the part of the body opposite one electrode conducts away heat more rapidly or has greater heat absorbing capacity than the part opposite the other electrode. The operator can compensate for this by decreasing slightly the pressure of one electrode so as to increase its contact resistance with the body.

Other specific forms of apparatus may be used in carrying out my process, as used in the rail bonding art. However, the invention is not limited in its application to rail bonding, but may be employed for other specific purposes and the apparatus which in any case is utilized, will depend upon the particular circumstances and conditions met, and by the character of the work or parts to be united.

Although the particular utility of this invention lies in the brazing of bonds to rails, and although, as before stated, it cannot be utilized for the purpose of welding copper bonds to rails, nor do I believe in welding together any parts possessing such widely different fusion points, such as steel and copper, and widely different masses, especially when it is essential or desirable that the heat be applied to the body having the lower fusion point, nevertheless, the invention may be used under such circumstances, or for the purpose of uniting bodies of such characteristics, such for example, as when the electrodes are pressed against that one of the two bodies to be united, which has the higher fusion point, the method may be employed for welding purposes, I therefore in my claims do not wish to be limited to brazing alone.

Having described my invention, what I claim is:

1. The process of uniting adjacent metal bodies which consists in holding against one of said bodies with relatively variable pressures two heating electrodes and passing a heating current through the two electrodes and through the said body with the three parts in series relationship.

2. The process of uniting adjacent metal bodies which consists in heating one of said bodies and the adjacent portion of the other to brazing temperature by holding against one of said bodies with relatively variable pressures two heating electrodes and passing a heating current through the two electrodes and through the said body with the three parts in series relationship.

3. The process of uniting adjacent metal bodies which consists in heating both of said bodies by passing an electric current through one of said bodies and through two heating electrodes with the three parts in series relationship and pressing the electrodes against the said body in such a manner that substantially uniform heating effects are secured opposite both electrodes.

4. The process of uniting adjacent metal bodies which consists in heating both of said bodies by passing an electric current through one of said bodies and through two heating electrodes with the three parts in series relationship, and pressing the electrodes against the said body in such a manner that predetermined heating effects are secured opposite both electrodes.

5. The process of uniting adjacent metal bodies which comprises heating both said bodies by directly heating one of said bodies by holding against said body a pair of adjacent heating electrodes and passing a current through the electrodes and through the said body with the three parts in series relationship, in such a manner that said body is substantially uniformly heated.

6. The process of uniting adjacent metal bodies which comprises heating one of said bodies which heats the other by conduction, by passing an electric current through one of said bodies and through two heating electrodes, and by pressing the electrodes against the said body in such a way as to maintain the same or predetermined relative resistances at the surfaces of contact between the electrodes and said body.

In testimony whereof, I hereunto affix my signature in the presence of two witnesses.

LAWRENCE P. CRECELIUS.

Witnesses:
L. I. PORTER,
A. F. KWIS.